US011909809B2

(12) United States Patent
Kawabata (10) Patent No.: US 11,909,809 B2
(45) Date of Patent: Feb. 20, 2024

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Shinji Kawabata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 647 days.

(21) Appl. No.: 16/822,572

(22) Filed: Mar. 18, 2020

(65) Prior Publication Data

US 2021/0067580 A1 Mar. 4, 2021

(30) Foreign Application Priority Data

Aug. 28, 2019 (JP) .................. 2019-155886

(51) Int. Cl.
*H04L 67/06* (2022.01)
*G06F 16/11* (2019.01)
*H04L 67/1095* (2022.01)

(52) U.S. Cl.
CPC ............ *H04L 67/06* (2013.01); *G06F 16/119* (2019.01); *H04L 67/1095* (2013.01)

(58) Field of Classification Search
CPC ..... H04L 67/06; H04L 67/1095; G06F 16/119
See application file for complete search history.

(56) References Cited

U.S. PATENT DOCUMENTS

| 7,240,122 B2* | 7/2007 | Sato ...................... G06F 16/119 709/214 |
| 7,424,547 B2 | 9/2008 | Sato |
| 9,229,942 B1* | 1/2016 | MacNeill .............. G06F 16/119 |
| 9,563,628 B1* | 2/2017 | MacNeill ................ G06F 16/23 |
| 11,481,361 B1* | 10/2022 | Dhoke ................ G06F 16/1844 |

(Continued)

FOREIGN PATENT DOCUMENTS

| CN | 102314476 A | 1/2012 |
| CN | 106255967 A | 12/2016 |

(Continued)

OTHER PUBLICATIONS

Jul. 4, 2023 Office Action issued in Japanese Application No. 2019-155886.

(Continued)

*Primary Examiner* — Dhairya A Patel
(74) *Attorney, Agent, or Firm* — Oliff PLC (57) ABSTRACT

An information processing apparatus includes an acquiring part, a copying part, and a controller. The acquiring part acquires a file structure at a migration source and an identification information item to identify a file at the migration source. Before migration of a content data item of the file at the migration source, the copying part copies the file structure and the identification information item to a migration destination in accordance with necessity or nonnecessity of copying the file structure and the identification information item, and the necessity or nonnecessity is determined by (Continued)

using an attribute information item of the file at the migration source and a history of access to the file at the migration source.

16 Claims, 7 Drawing Sheets

(56) References Cited

U.S. PATENT DOCUMENTS

| | | |
|---|---|---|
| 2004/0236797 A1 | 11/2004 | Ikegaya et al. |
| 2005/0055402 A1 | 3/2005 | Sato |
| 2010/0076895 A1* | 3/2010 | Spencer ............. G06Q 10/0637 705/7.36 |
| 2010/0274825 A1 | 10/2010 | Nemoto et al. |
| 2014/0006465 A1* | 1/2014 | Davis .................. G06F 16/1752 707/827 |
| 2015/0036184 A1* | 2/2015 | Hamaguchi ........ H04N 1/32363 358/1.15 |
| 2015/0278397 A1* | 10/2015 | Hendrickson ....... G06F 16/9024 707/798 |
| 2015/0356078 A1 | 12/2015 | Kishimoto et al. |
| 2016/0246545 A1* | 8/2016 | Yokoi .................... G06F 3/0667 |
| 2016/0364395 A1 | 12/2016 | Shorten et al. |
| 2017/0228370 A1* | 8/2017 | Wilcock ................ G06F 16/113 |
| 2019/0057139 A1* | 2/2019 | Gao ........................ G06F 16/27 |
| 2020/0106778 A1* | 4/2020 | Park ...................... H04L 63/108 |
| 2021/0067580 A1* | 3/2021 | Kawabata ............... G06F 3/067 |
| 2021/0133681 A1* | 5/2021 | Dhaliwal ............. G06Q 10/101 |

FOREIGN PATENT DOCUMENTS

| | | |
|---|---|---|
| CN | 107797884 A | 3/2018 |
| JP | 2002049619 A | 2/2002 |
| JP | 2004-302505 A | 10/2004 |
| JP | 2005-84963 A | 3/2005 |
| JP | 2007011844 A | 1/2007 |
| JP | 2011-198071 A | 10/2011 |
| JP | 2016-085666 A | 5/2016 |
| JP | 2018-524689 A | 8/2018 |
| WO | 2015/186248 A1 | 12/2015 |

OTHER PUBLICATIONS

Sep. 12, 2023 Office Action issued in Japanese Patent Application No. 2019-155886.
Nov. 9, 2023 Office Action issued in Chinese Patent Application No. 202010174599.6.
Dec. 5, 2023 Decision of Dismissal of Amendment issued in Japanese Patent Application No. 2019-155886.
Dec. 5, 2023 Decision of Refusal issued in Japanese Patent Application No. 2019-155886.

* cited by examiner

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-155886 filed Aug. 28, 2019.

BACKGROUND

(i) Technical Field

The present disclosure relates to an information processing apparatus, an information processing system, and a non-transitory computer readable medium storing a program.

(ii) Related Art

Japanese Unexamined Patent Application Publication No. 2005-084963 proposes a file sharing device that includes data migrating means and access processing means. The data migrating means causes data retained in a file system of a migration source file sharing device to migrate to a file system of the file sharing device. The access processing means processes access from a host computer in correspondence to data migration statuses during the data migration processing. The access processing means provides data from the file system of the file sharing device in the case of access to data that can be used from the file system of the file sharing device and causes data to be provided from the file system of the migration source file sharing device in the case of access to data that cannot be used from the file system of the file sharing device.

Japanese Unexamined Patent Application Publication No. 2011-198071 proposes an application migration system that includes a personal computer and a migration management server. The personal computer identifies data that is necessary to execute each application installed on the personal computer, records the history of use of each application, reports the history to the migration management server, and transfers an application in accordance with a command received from the migration management server. The migration management server calculates the frequency of use of each application in accordance with the history of use of the application and sends a command to instruct the personal computer to transfer applications to another computer in order of priority based on the frequency.

SUMMARY

Techniques and methods are available for sequentially migrating data items in order of priority or the frequency of use. However, since all the data items, which include unnecessary data items, are to be migrated, it takes a long time before a system becomes operable. Aspects of non-limiting embodiments of the present disclosure relate to providing an information processing apparatus, an information processing system, and a non-transitory computer readable medium storing an information processing program that enable migration of data items while suppressing migration of unnecessary data items in contrast to a case where all the data items are to be migrated.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an acquiring part, a copying part, and a controller. The acquiring part acquires a file structure at a migration source and an identification information item to identify a file at the migration source. Before migration of a content data item of the file at the migration source, the copying part copies the file structure and the identification information item to a migration destination in accordance with necessity or non-necessity of copying the file structure and the identification information item, and the necessity or nonnecessity is determined by using an attribute information item of the file at the migration source and a history of access to the file at the migration source. The controller controls migration of the content data item of the file at the migration source in accordance with necessity or nonnecessity of migrating the content data item, and the necessity or nonnecessity is determined by using the attribute information item and the history of access.

BRIEF DESCRIPTION OF THE DRAWINGS

An exemplary embodiment of the present disclosure will be described in detail based on the following figures, wherein.

DETAILED DESCRIPTION

Figure 1:
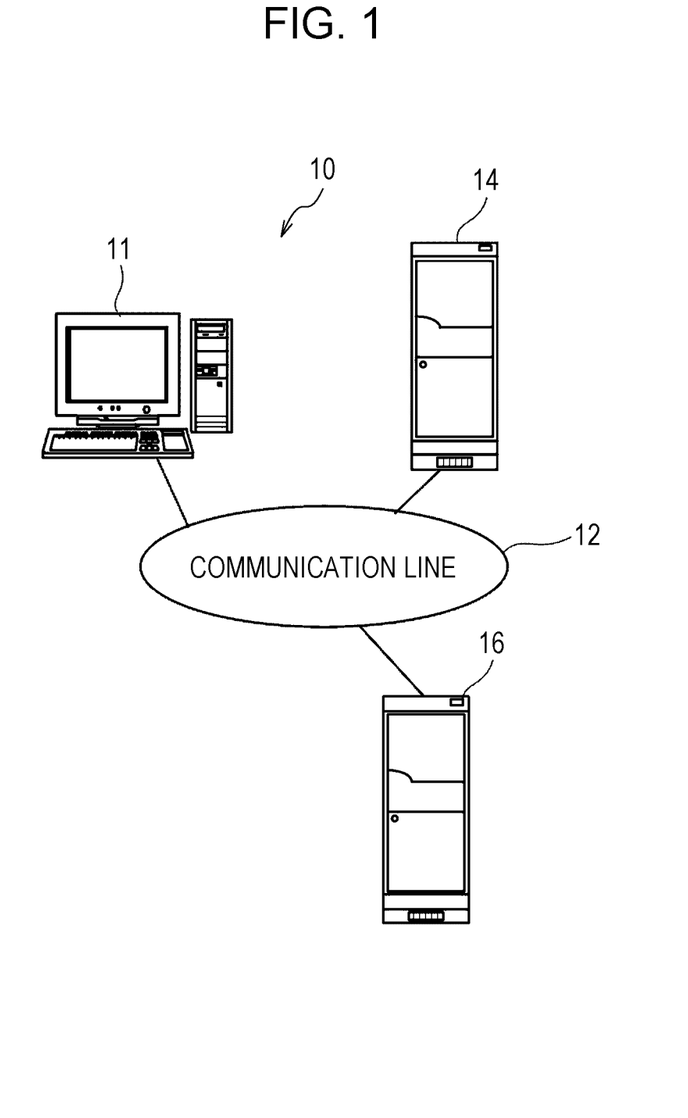
FIG. 1 is an illustration depicting a schematic configuration of an information processing system according to the present exemplary embodiment.

Hereinafter, an example in the present exemplary embodiment will be described in detail with reference to the drawings. In the present exemplary embodiment, an information processing system in which an information processing terminal and a plurality of servers are connected to each other via a communication line, such as various kinds of networks, will be described as an example. FIG. 1 is an illustration depicting a schematic configuration of an information processing system 10 according to the present exemplary embodiment.

The information processing system 10 according to the present exemplary embodiment includes an information processing terminal 11, a cloud server 14, which serves as an information processing apparatus, and a server 16, which serves as a migration-source manager, as depicted in FIG. 1. In the present exemplary embodiment, an example of the information processing system 10 that includes a single information processing terminal 11, a single cloud server 14, and a single server 16 is described, but the information processing system 10 may include one or more information processing terminals 11, one or more cloud servers 14, and one or more servers 16.

The information processing terminal 11, the cloud server 14, and the server 16 are connected to each other via a communication line 12, such as a local area network (LAN), a wide area network (WAN), the Internet, or an intranet. The information processing terminal 11, the cloud server 14, and the server 16 are capable of transmitting and receiving various kinds of data to and from each other via the communication line 12.

In the information processing system 10 according to the present exemplary embodiment, the cloud server 14 provides a system migration service and a document management service as a cloud service. The system migration service performs, for example, a process in which a system such as a document management system that is set up in the server 16 located on premises is migrated to a document management system provided by the cloud server 14 or to a different system such as the information processing terminal 11. In the present exemplary embodiment, system migration is described under the assumption that a system at a migration source is copied to a migration destination, but a system at a migration source may be migrated to a migration destination without retaining the system at the migration source.

Figure 2:
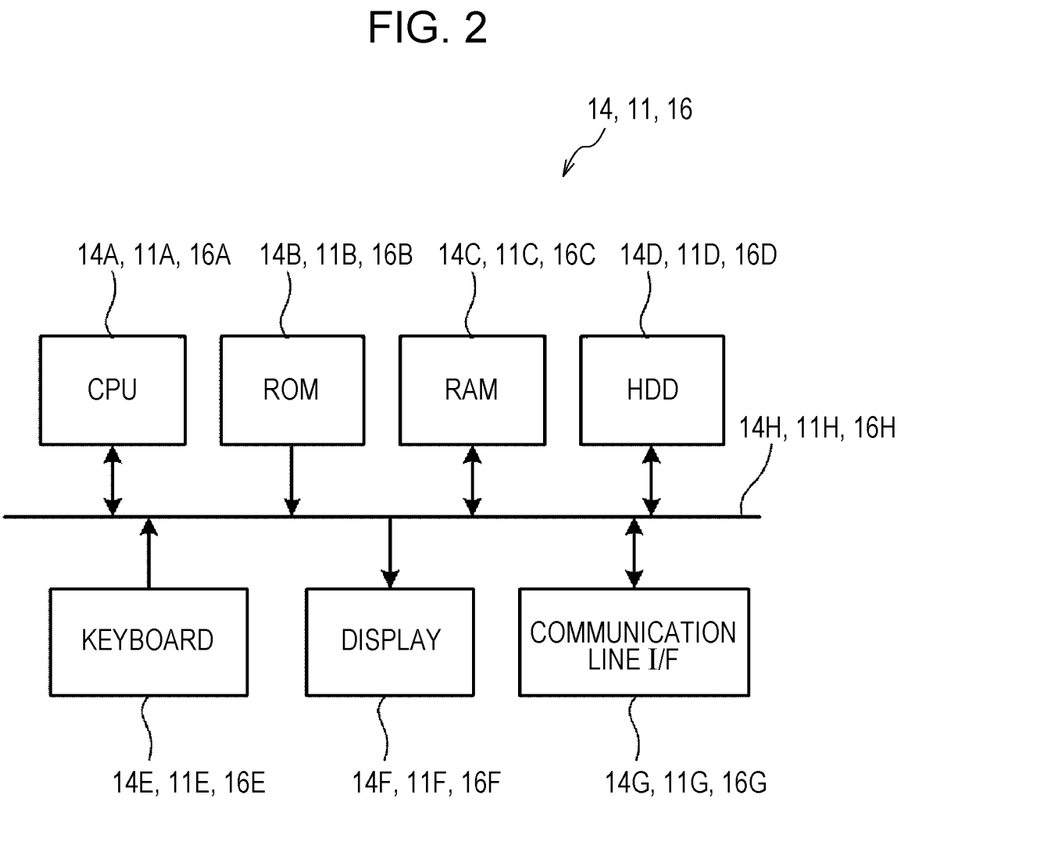
FIG. 2 is a block diagram depicting a configuration of major electrical components of each of an information processing terminal, a cloud server, and a server in the information processing system according to the present exemplary embodiment.

Next, a configuration of major electrical components of each of the information processing terminal 11, the cloud server 14, and the server 16 according to the present exemplary embodiment will be described. FIG. 2 is a block diagram depicting a configuration of major electrical components of each of the information processing terminal 11, the cloud server 14, and the server 16 in the information processing system 10 according to the present exemplary embodiment. The information processing terminal 11, the cloud server 14, and the server 16 each are basically designed to have a configuration of a general-purpose computer, and thus the cloud server 14 will be described as a representative example.

The cloud server 14 according to the present exemplary embodiment includes a central processing unit (CPU) 14A, a read-only memory (ROM) 14B, a random-access memory (RAM) 14C, a hard disk drive (HDD) 14D, a keyboard 14E, a display 14F, and a communication line interface (I/F) 14G, as depicted in FIG. 2. The CPU 14A manages the entire operation of the cloud server 14. The ROM 14B stores various control programs, various parameters, and the like in advance. The RAM 14C is used as a work area and the like while the CPU 14A executes various programs. The HDD 14D stores various kinds of data, application programs, and the like. The keyboard 14E is used for inputting various kinds of information. The display 14F is used for displaying various kinds of information. The communication line I/F 14G is connected to the communication line 12 and transmits and receives various kinds of data to and from other apparatuses connected to the communication line 12. All the above units in the cloud server 14 are electrically connected to each other via a system bus 14H. In the cloud server 14 according to the present exemplary embodiment, although the HDD 14D is adopted as a storage unit, this is not meant to be limiting, and a different nonvolatile storage unit, such as a flash memory, may be adopted.

In the above configuration of the cloud server 14 according to the present exemplary embodiment, the CPU 14A performs access to the ROM 14B, the RAM 14C, and the HDD 14D, acquisition of various kinds of data via the keyboard 14E, and display of various kinds of information on the display 14F. The cloud server 14 also controls by using the CPU 14A transmission and reception of communication data via the communication line I/F 14G.

In the information processing system 10 according to the present exemplary embodiment, the information processing system 10 being configured in this way, the cloud server 14 provides the system migration service, the document management service, and an archive storage service as a cloud service, as described above. A description will be given below, as an example, of a case where the system migration service migrates a migration-source document management system 17 that is set up in the server 16 to a document management service provided by the cloud server 14 (hereinafter referred to as a migration-destination document management system 18). When data items are migrated, the archive storage service performs a process of storing a data item in an archive if the data item meets a predetermined requirement and deleting a data item if it is determined that the data item is unnecessary.

When files in a document management system are migrated, a known technique creates a complete copy and a differential copy of the entire system to migrate the system. However, while the complete copy of the entire system is being created, the system needs to be shut down. Further, the system shutdown period is sometimes prolonged in proportion to the amount of data. Thus, in the present exemplary embodiment, the file structure at a migration source and the identification information items each of which identifies a file at the migration source are copied to a migration destination before content data items of one or more files at the migration source is migrated. In this way, once the file structure and the identification information items are copied to the migration destination, the system at the migration destination is able to operate, and the system shutdown period is shortened compared with a case where the complete copy of the entire system is created.

However, if all the files are to be migrated, unnecessary files are also migrated, and it takes a long time to complete file migration. Thus, in the present exemplary embodiment, at the time of migration of the content data item of a file after the file structure and the identification information items are migrated, the necessity or nonnecessity of migrating the content data item is determined by using a history of access to the file, and the migration of the content data item is controlled in accordance with the necessity or nonnecessity that is determined. Specifically, the data, such as a history of access, included in an attribute information item is taken into account, and the necessity or nonnecessity of migration is determined. Then, migration of the content data item to the migration destination, migration of the content data item to the archive, or deletion of the content data item is performed in accordance with a predetermined condition.

Figure 3:
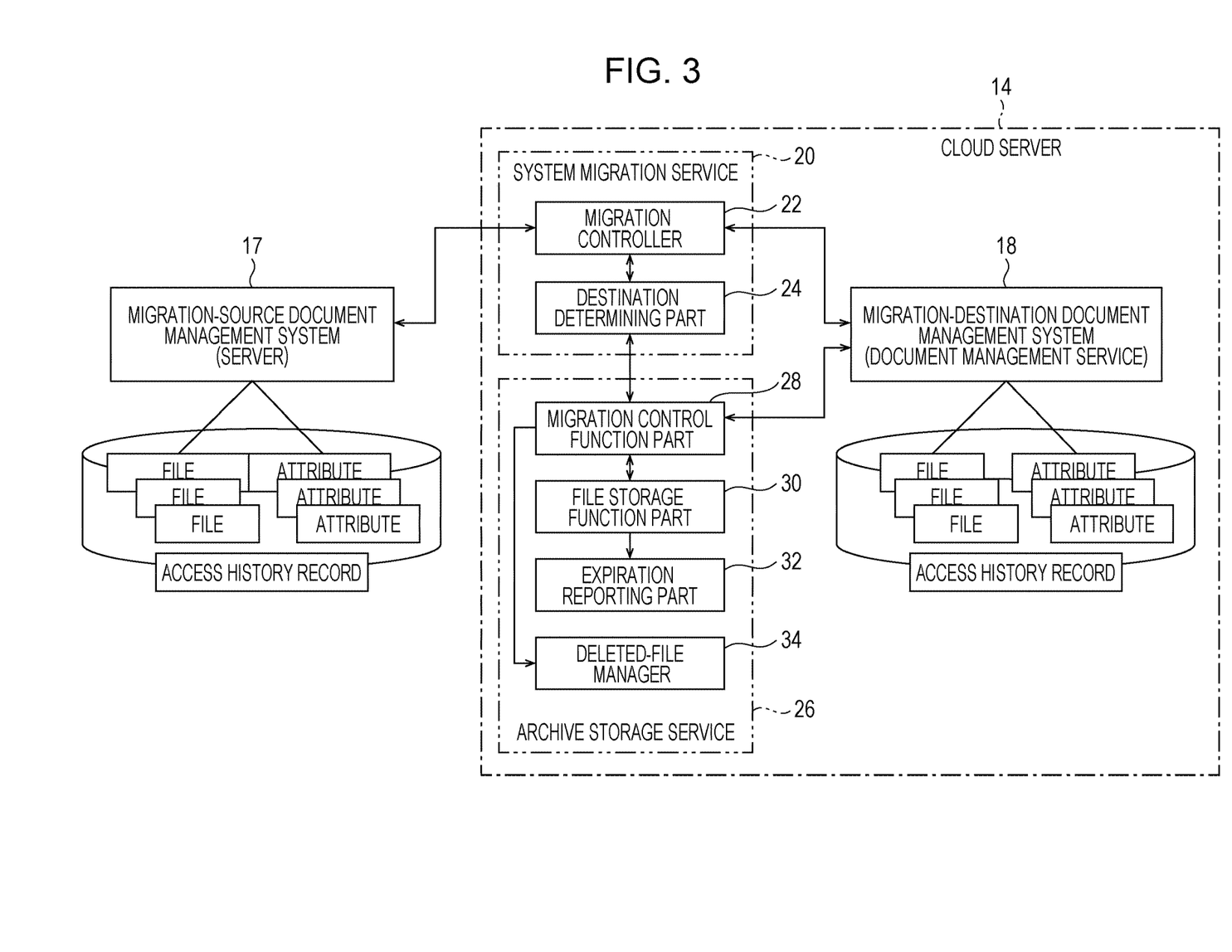
FIG. 3 is a block diagram depicting a functional configuration of the cloud server in the information processing system according to the present exemplary embodiment.

FIG. 3 is a block diagram depicting a functional configuration of the cloud server 14 in the information processing system 10 according to the present exemplary embodiment.

As described above, the information processing system 10 according to the present exemplary embodiment provides a system migration service 20, the migration-destination document management system 18, and an archive storage service 26 as a cloud service.

The system migration service 20 migrates to the migration-destination document management system 18, which serves as a migration-destination manager, a plurality of files and attributes of the plurality of files, both of which are managed by the migration-source document management system 17, together with the file structure including a hierarchical structure of the files.

The system migration service 20 includes functions of a migration controller 22 and a destination determining part 24, as depicted in FIG. 3. The migration controller 22 corresponds to an acquiring part, a copying part, and a controller.

The migration controller 22 controls migration of files to be migrated from the migration-source document management system 17 to the migration-destination document management system 18. In the present exemplary embodiment, the file structure at the migration source, which includes a hierarchy of files and a tree structure, and the identification information items each of which identifies a file are acquired from the migration-source document management system 17, and the file structure and the identification information items are copied to the migration-destination document management system 18 before content data items of the files are migrated. The migration controller 22 also migrates the system by sequentially copying content data items of the files in the migration-source document management system 17 to corresponding locations of the file structure and the identification information items, which have been copied. Attribute information items of the files are also acquired simultaneously and copied to the migration-destination document management system 18 when the file structure and the identification information items are copied to the migration-destination document management system 18. Examples of the attribute information items include a registration date, an access date, a drawing number, a file type, and a document type.

Figure 4:
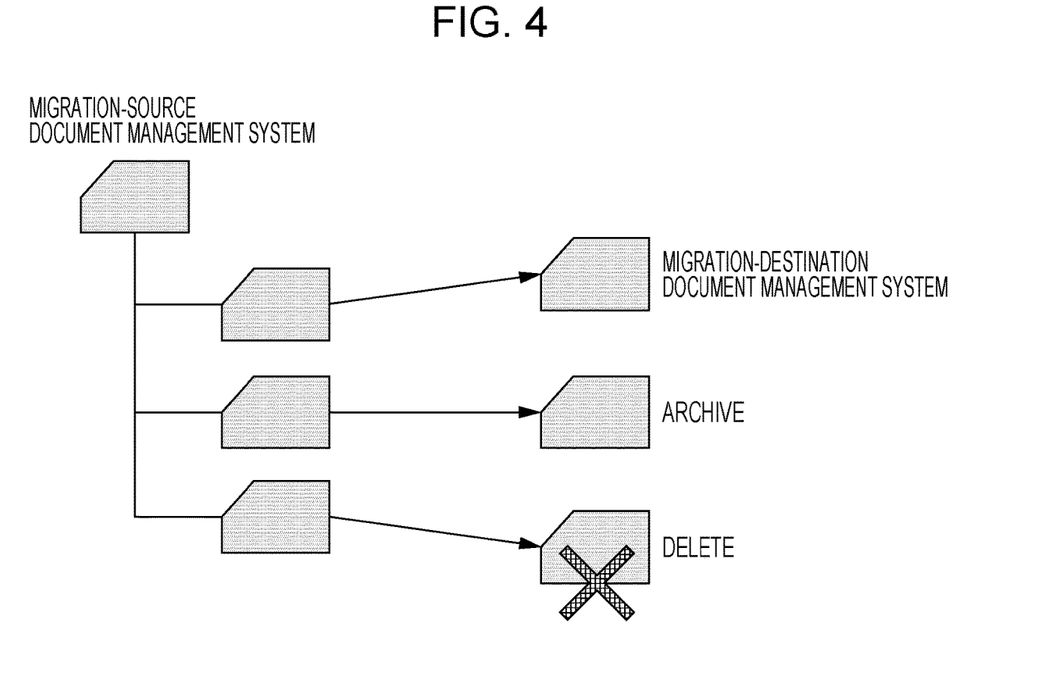
FIG. 4 is an illustration depicting an example in which a destination is determined by a destination determining part.

Further, the destination determining part 24 determines destinations when the migration controller 22 controls migration of files to be migrated. In the present exemplary embodiment, a destination is determined based on the history of access and the attribute information item of a file. Specifically, as depicted in FIG. 4, the destination determining part 24 selects one of the following operations: migration of the content data item of the file to the migration-destination document management system 18, migration of the content data item of the file to the archive in the archive storage service 26, and deletion of the file. Then, migration of the file is controlled in accordance with the selection result. In detail, the destination determining part 24 selects one of the following operations: migration of the attribute information item and the content data item of the file to the migration-destination document management system 18, migration of the attribute information item to the migration-destination document management system 18 and migration of the content data item of the file to the archive storage service 26, and deletion of the attribute information item and the content data item of the file.

The archive storage service 26 has functions of a migration control function part 28, a file storage function part 30, an expiration reporting part 32, and a deleted-file manager 34.

The migration control function part 28 stores in the archive storage service 26 the content data item of a file that the destination determining part 24 has determined not to migrate to the migration-destination document management system 18 but to store in the archive storage service 26. In addition, in the migration-destination document management system 18, in response to an access to an attribute information item corresponding to the content data item of a file stored in the archive storage service 26, the migration control function part 28 performs the processing of migrating the content data item of the file to the migration-destination document management system 18.

The file storage function part 30 stores in the archive the content data item of a file that the destination determining part 24 has determined not to migrate to the migration-destination document management system 18.

If a content data item whose period of validity has expired is present among content data items of files stored in the archive by the file storage function part 30, the expiration reporting part 32 reports on the expiration to a user.

The deleted-file manager 34 lists one or more files deleted without being migrated to the migration-destination document management system 18.

Figure 5:
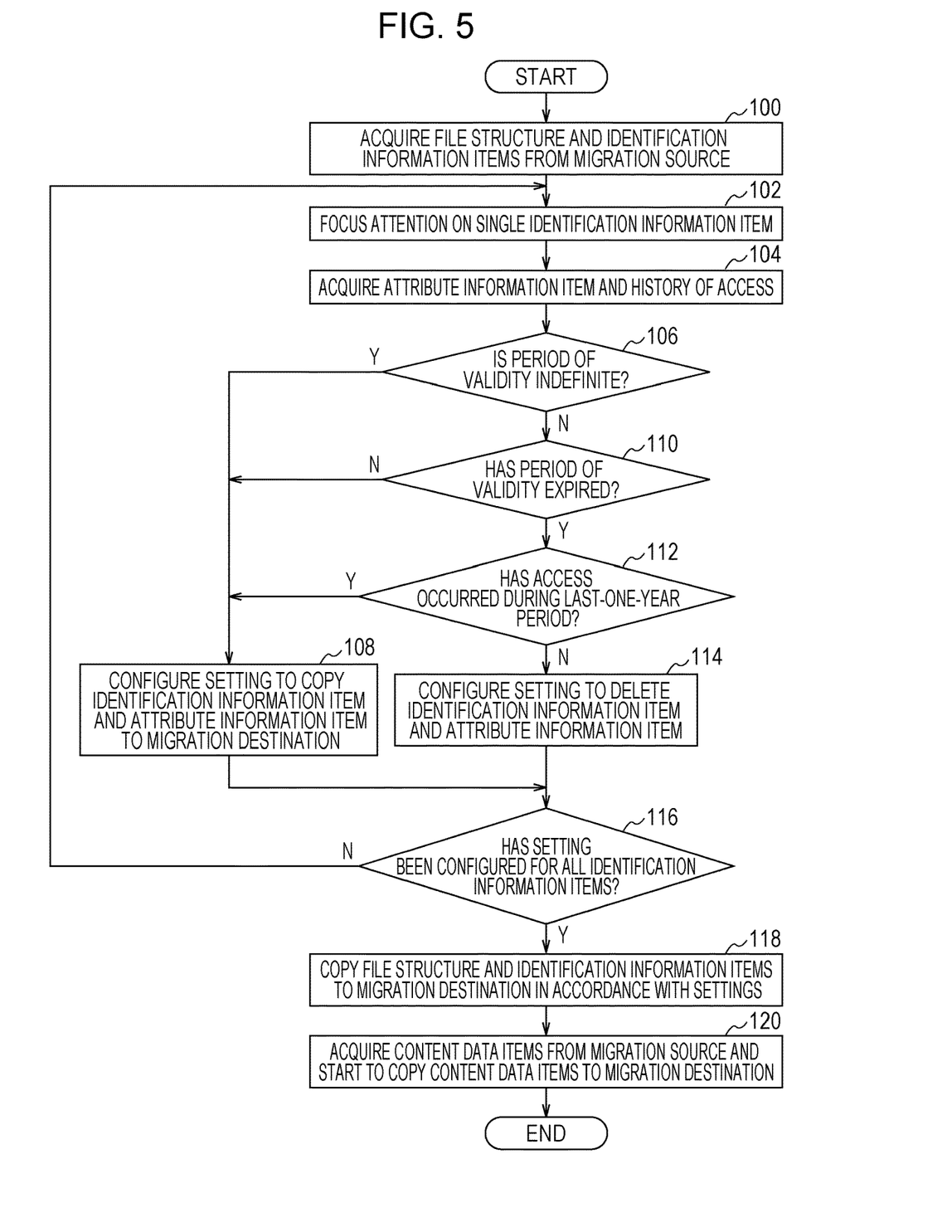
FIG. 5 is a flowchart depicting an example flow of a process performed by a system migration service of the cloud server in the information processing system according to the present exemplary embodiment.

Next, a description will be given of a process performed by the cloud server 14 in the information processing system 10 according to the present exemplary embodiment, the information processing system 10 being configured as described above. FIG. 5 is a flowchart depicting an example flow of the process performed by the system migration service 20 of the cloud server 14 in the information processing system 10 according to the present exemplary embodiment. The process depicted in FIG. 5 starts when instructions to perform migration from the migration-source document management system 17 to the migration-destination document management system 18 are provided.

In step 100, the migration controller 22 acquires from the migration-source document management system 17 the file structure and the identification information items each of which identifies a file, and the process proceeds to step 102. Step 100 corresponds to an operation performed by the acquiring part.

In step 102, the migration controller 22 focuses attention on a single identification information item, and the process proceeds to step 104.

In step 104, the migration controller 22 acquires from the migration-source document management system 17 the attribute information item and the history of access that correspond to the identification information item receiving attention, and the process proceeds to step 106.

In step 106, the migration controller 22 determines based on the acquired attribute information item whether the period of validity is indefinite. If an affirmative determination is made in step 106, the process proceeds to step 108. If a negative determination is made in step 106, the process proceeds to step 110.

In step 108, the migration controller 22 configures a setting to copy the identification information item receiving attention and the corresponding attribute information item to the migration destination, and the process proceeds to step 116.

In step 110, the migration controller 22 determines based on the acquired attribute information item whether the period of validity has expired. If an affirmative determination is made in step 110, the process proceeds to step 112. If a negative determination is made in step 110, the process proceeds to step 108 described above.

In step 112, the migration controller 22 determines based on the acquired history of access whether an access has occurred during the last-one-year period. If an affirmative determination is made in step 112, the process proceeds to step 108 described above. If a negative determination is made in step 112, the process proceeds to step 114.

In step 114, the migration controller 22 configures a setting to delete the identification information item receiving attention and the corresponding attribute information item, and the process proceeds to step 116.

In step 116, the migration controller 22 determines whether a setting to copy or to delete has been configured for each of the identification information items. If a negative determination is made in step 116, the process returns to step 102, next identification information item receives attention, and the above procedure is repeated. If an affirmative determination is made in step 116, the process proceeds to step 118.

In step 118, the migration controller 22 copies to the migration-destination document management system 18 the file structure and the identification information items in accordance with the settings, and the process proceeds to step 120. Once the file structure and the identification information items are copied to the migration-destination document management system 18, the file structure and the identification information items are viewable, and thus the migration-destination document management system 18 is able to operate. Step 118 corresponds to an operation performed by the copying part.

In step 120, the migration controller 22 acquires content data items of files from the migration-source document management system 17 and starts to sequentially copy the content data items to the migration-destination document management system 18, and a series of procedures is finished.

Figure 6:
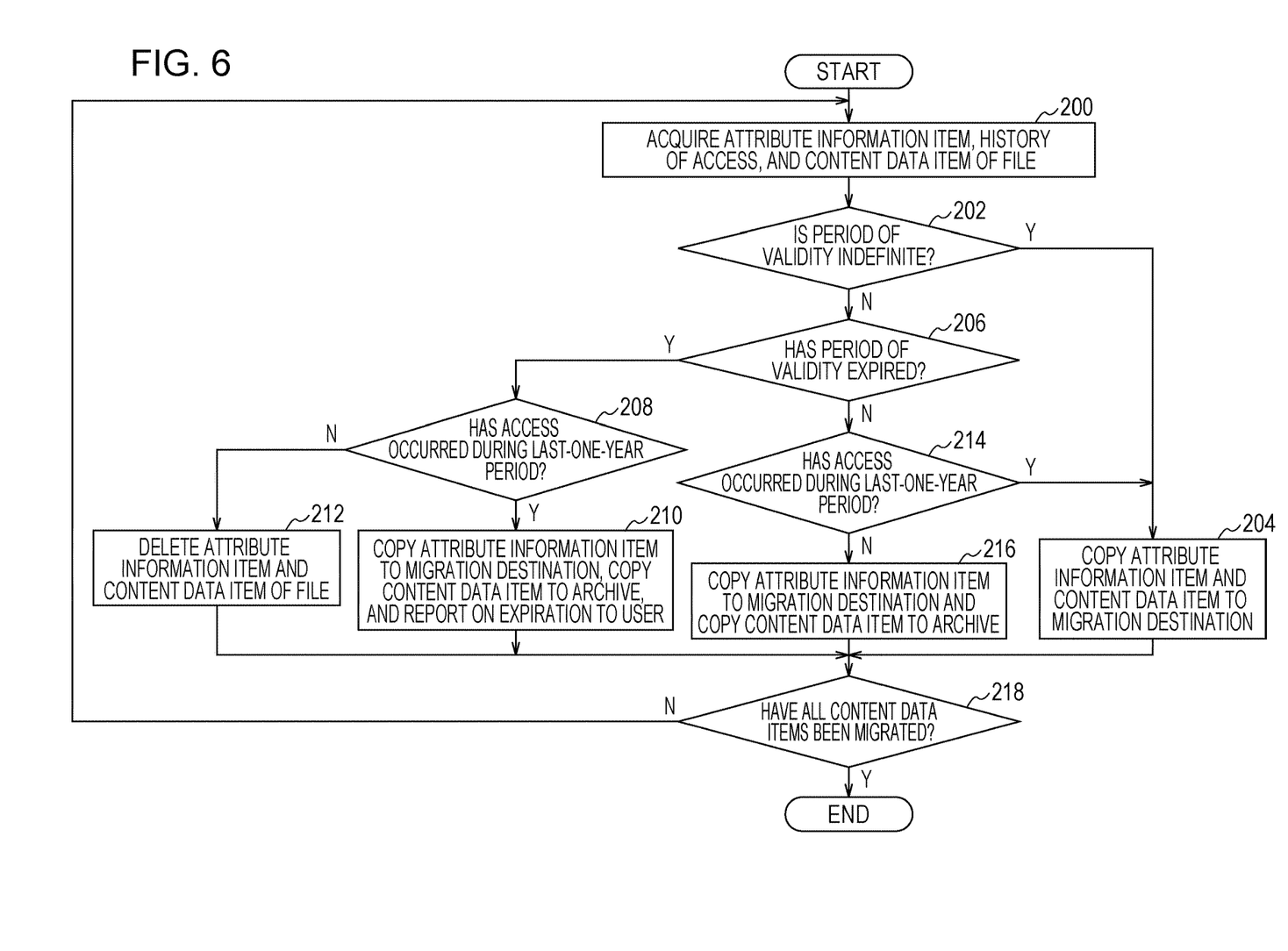
FIG. 6 is a flowchart depicting an example flow of a process performed by the system migration service of the cloud server to start to copy content data items of files from a migration source to a migration destination in the information processing system according to the present exemplary embodiment.

Next, a description will be given of a process performed by the system migration service 20 of the cloud server 14 to start to copy content data items of files from a migration source to a migration destination. FIG. 6 is a flowchart depicting an example flow of a process performed by the system migration service 20 of the cloud server 14 to start to copy content data items of files from a migration source to a migration destination in the information processing system 10 according to the present exemplary embodiment.

In step 200, the migration controller 22 acquires the attribute information item, the history of access, and the content data item of a file from the migration-source document management system 17, and the process proceeds to step 202.

In step 202, the destination determining part 24 determines based on the acquired attribute information item whether the period of validity is indefinite. If an affirmative determination is made in step 202, the process proceeds to step 204. If a negative determination is made in step 202, the process proceeds to step 206.

In step 204, the migration controller 22 migrates the file by copying the attribute information item and the content data item of the file to the migration-destination document management system 18, and the process proceeds to step 218.

In step 206, the destination determining part 24 determines based on the acquired attribute information item whether the period of validity has expired. If a negative determination is made in step 206, the process proceeds to step 214. If an affirmative determination is made in step 206, the process proceeds to step 208.

In step 208, the destination determining part 24 determines based on the acquired history of access whether an access has occurred during the last-one-year period. If an affirmative determination is made in step 208, the process proceeds to step 210. If a negative determination is made in step 208, the process proceeds to step 212.

In step 210, the migration controller 22 copies the attribute information item to the migration-destination document management system 18, copies the content data item of the file to the archive in the archive storage service 26, and reports on the expiration to the user, and the process proceeds to step 218.

In step 212, the migration controller 22 deletes the attribute information item and the content data item of the file, and the process proceeds to step 218.

In contrast, in step 214, the destination determining part 24 determines based on the acquired history of access whether an access has occurred during the last-one-year period. If an affirmative determination is made in step 214, the process proceeds to step 204 described above. If a negative determination is made in step 214, the process proceeds to step 216.

In step 216, the migration controller 22 copies the attribute information item to the migration-destination document management system 18 and copies the content data item of the file to the archive in the archive storage service 26, and the process proceeds to step 218.

In step 218, the migration controller 22 determines whether the content data items of all the files have been migrated. The determination is made based on whether the procedures in steps 200 to 216 described above are finished for all the files. If a negative determination is made in step 218, the process returns to step 200 and repeats the above procedures. Then, if an affirmative determination is made in step 218, the process completes a series of procedures.

Figure 7:
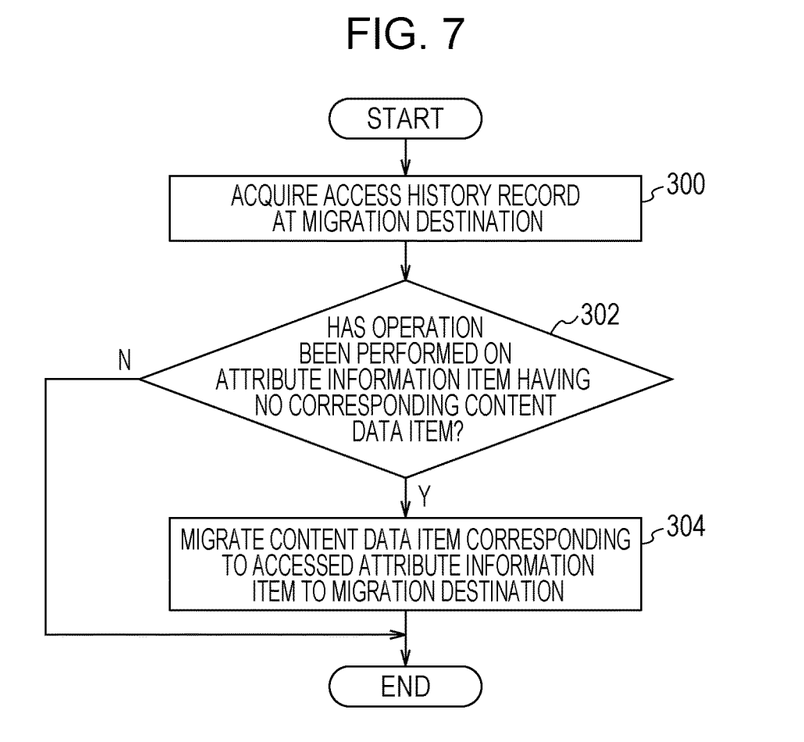
FIG. 7 is a flowchart depicting an example flow of a process performed by an archive storage service of the cloud server in the information processing system according to the present exemplary embodiment.

Next, a process performed by the archive storage service 26 will be described. FIG. 7 is a flowchart depicting an example flow of a process performed by the archive storage service 26 of the cloud server 14 in the information processing system 10 according to the present exemplary embodiment. If the content data item of a file is stored in the archive by the file storage function part 30, the process in FIG. 7 is performed on a regular basis at predetermined regular intervals or once in every interval. Alternatively, the process in FIG. 7 is started in response to an operation on an attribute information item having no corresponding content data item of a file in the migration-destination document management system 18.

In step 300, the migration control function part 28 acquires an access history record of the migration-destination document management system 18, and the process proceeds to step 302.

In step 302, the migration control function part 28 determines whether an operation has been performed on an attribute information item having no corresponding content data item of a file. In other words, it is determined whether an operation has been performed on an attribute information item corresponding to a file whose content data is stored in the archive without being migrated. If an affirmative determination is made in step 302, the process proceeds to step 304. If a negative determination is made in step 302, a series of procedures is finished.

In step 304, the migration control function part 28 acquires from the file storage function part 30 the content data item of the file corresponding to the accessed attribute information item and migrates the content data item to the migration-destination document management system 18, and a series of procedures is finished.

Figure 8:
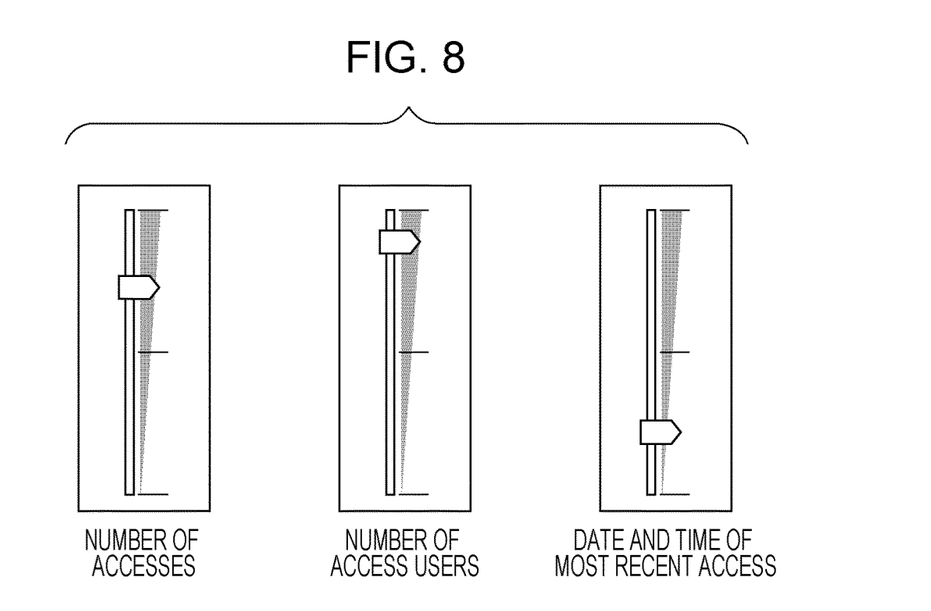
FIG. 8 is an illustration depicting an example of a screen for setting the number of accesses, the number of access users, and the date and time of the most recent access.

In the above exemplary embodiment, an attribute information item and a content data item are deleted if the period of validity has expired and no access has occurred during the last-one-year period. But a requirement for deletion is not limited to this condition, and, for example, a requirement for deletion may be modifiable. Specifically, a period during which no access has occurred may be set to more than one year as a requirement for deletion if at least one of the number of accesses and the number of access users is large. In this case, for example, the screen depicted in FIG. 8 enables a user to set the number of accesses, the number of access users, and the date and time of the most recent access. If at least one of the number of accesses and the number of access users is equal to or more than a threshold that is set, the date and time of the most recent access is changed to the date and time that is set. More specifically, when step 208 above is performed, the number of accesses and the number of access users are checked, and if the number of accesses is equal to a threshold or more or the number of access users is equal to a threshold or more, or if the number of accesses and the number of access users are both equal to respective thresholds or more, the date and time used to determine in step 208 whether an access has occurred in the history of access is changed to the date and time of the most recent access that is set.

The system migration from the server 16 to the cloud server 14 is described as an example in the above exemplary embodiment, but this is not meant to be limiting. For example, the above exemplary embodiment may be applied to a system migration between two of the servers 16 on premises or to a system migration between two of the cloud servers 14.

The process performed by the cloud server 14 according to the above exemplary embodiment may be a process performed by using software, a process performed by using hardware, or a process performed by using a combination of software and hardware. The process performed by the cloud server 14 may be stored in a recording medium as a program and distributed by using the recording medium.

The present disclosure is not limited to the above exemplary embodiment, and various modifications other than the above exemplary embodiment may obviously be practiced as long as they do not depart from the spirit of the disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a hardware processor configured to:
   acquire a file structure at a migration source and an identification information item to identify a file at the migration source;
   before migration of a content data of the file at the migration source, copy the file structure, and copy the identification information item to a migration destination in accordance with necessity or nonnecessity of copying the identification information item, the necessity or nonnecessity being determined based on an attribute information item of the file at the migration source and a history of access to the file at the migration source, the attribute information item including a period of validity that includes one of indefinite and finite, whereby if the period of validity is finite, the period of validity is expired, and the history of access indicates that the file has not been accessed for a predetermined amount of time, the identification information item is deleted, and in other cases, the identification information is copied to the migration destination; and
   control a migration of the content data of the file at the migration source in accordance with necessity or nonnecessity of migrating the content data, the necessity or nonnecessity being determined such that:
   if the period of validity is finite, the period of validity has expired, and the access history indicates that the file has not been accessed for the predetermined amount of time, the content data is deleted, and
   if the period of validity is indefinite, the content data is migrated to the migration destination.

2. The information processing apparatus according to claim 1,
   wherein the hardware processor controls migration of the content data to a position where the file structure and the identification information item are copied at the migration destination, or controls migration of the content data to a predetermined storage destination.

3. The information processing apparatus according to claim 2,
   wherein if the identification information item that corresponds to the content data stored in the predetermined storage destination is accessed, the hardware processor migrates the content data stored in the predetermined storage destination to the migration destination.

4. The information processing apparatus according to claim 3,
   wherein if the period of validity in the attribute information item has not expired and the history of access includes an access that has occurred during a predetermined period, the hardware processor copies the file structure and the identification information item to the migration destination, and the hardware processor controls migration of the content data to the migration destination.

5. The information processing apparatus according to claim 4,
   wherein if the period of validity in the attribute information item has not expired and the history of access includes no access that has occurred during the predetermined period, the hardware processor copies the file structure and the identification information item to the migration destination, and the hardware processor controls migration of the content data to the predetermined storage destination.

6. The information processing apparatus according to claim 2,
   wherein if the period of validity in the attribute information item has not expired and the history of access includes an access that has occurred during a predetermined period, the hardware processor copies the file structure and the identification information item to the migration destination, and the hardware processor controls migration of the content data to the migration destination.

7. The information processing apparatus according to claim 6,
wherein if the period of validity in the attribute information item has not expired and the history of access includes no access that has occurred during the predetermined period, the hardware processor copies the file structure and the identification information item to the migration destination, and the hardware processor controls migration of the content data to the predetermined storage destination.

8. The information processing apparatus according to claim 3, further comprising:
a migration-destination manager that serves as the migration destination and that manages a plurality of files.

9. The information processing apparatus according to claim 2,
wherein if a predetermined period of validity in the attribute information item has expired and the history of access includes an access that has occurred during a predetermined period, the hardware processor copies the file structure and the identification information item to the migration destination, and the hardware processor controls migration of the content data to the predetermined storage destination.

10. The information processing apparatus according to claim 1,
wherein if the period of validity in the attribute information item has not expired and the history of access includes an access that has occurred during a predetermined period, the hardware processor copies the file structure and the identification information item to the migration destination, and the hardware processor controls migration of the content data to the migration destination.

11. The information processing apparatus according to claim 10,
wherein if the period of validity in the attribute information item has not expired and the history of access includes no access that has occurred during the predetermined period, the hardware processor copies the file structure and the identification information item to the migration destination, and the hardware processor controls migration of the content data to a predetermined storage destination.

12. The information processing apparatus according to claim 1,
wherein if the period of validity in the attribute information item has expired and the history of access includes an access that has occurred during a predetermined period, the hardware processor copies the file structure and the identification information item to the migration destination, and the hardware processor controls migration of the content data to a predetermined storage destination.

13. The information processing apparatus according to claim 1, further comprising:
a migration-destination manager that serves as the migration destination and that manages a plurality of files.

14. The information processing apparatus according to claim 1, the hardware processor being further configured to:
enable a user to set a number of accesses, a number of access users, and a date and time of the most recent access, and if at least one of the number of accesses and the number of access users is equal to or more than a threshold that is set, the predetermined amount of time is changed to a time from the date and time that is set.

15. An information processing system comprising:
an information processing apparatus including a hardware processor configured to:
acquire a file structure at a migration source and an identification information item to identify a file at the migration source,
before migration of a content data of the file at the migration source, copy the file structure, and copy the identification information item to a migration destination in accordance with necessity or nonnecessity of copying the identification information item, the necessity or nonnecessity being determined based on an attribute information item of the file at the migration source and a history of access to the file at the migration source, the attribute information item including a period of validity that includes one of indefinite and finite, whereby if the period of validity is finite, the period of validity is expired, and the history of access indicates that the file has not been accessed for a predetermined amount of time, the identification information item is deleted, and in other cases, the identification information is copied to the migration destination; and
control a migration of the content data of the file at the migration source in accordance with necessity or nonnecessity of migrating the content data, the necessity or nonnecessity being determined such that:
if the period of validity is finite, the period of validity has expired, and the access history indicates that the file has not been accessed for the predetermined amount of time, the content data is deleted, and
if the period of validity is indefinite, the content data is migrated to the migration destination,
the information processing system further comprising a migration-source manager that serves as the migration source and that manages a plurality of files to be migrated in a predetermined file structure together with identification information items each of which identifies one of the plurality of files to be migrated.

16. A non-transitory computer readable medium storing a program causing a computer to execute a process for information processing, the process comprising:
acquiring a file structure at a migration source and multiple identification information items to identify each of multiple files at the migration source;
before migration of a content data of the files at the migration source, copying the file structure, and copying the identification information items to a migration destination in accordance with necessity or nonnecessity of copying the identification information items, the necessity or nonnecessity being determined by using an attribute information item of the files at the migration source and a history of access to the files at the migration source, the attribute information item including a period of validity that includes one of indefinite and finite, whereby for a first file of the multiple files, the period of validity is finite, the period of validity is expired, and the history of access indicates that the first file has not been accessed for a predetermined amount of time, and the identification information item is deleted, and for a second file of the multiple files, the identification information is copied to the migration destination; and controlling migration of the content data of the files at the migration source in accordance with necessity or nonnecessity of migrating the content data, the necessity or nonnecessity being determined such that:

for the first file, the period of validity is finite, the period of validity has expired, and the access history indicates that the file has not been accessed for the predetermined amount of time, and the content data is deleted, and for the second file, the period of validity is indefinite, and the content data is migrated to the migration destination.

* * * * *